(12) United States Patent
Bertrand et al.

(10) Patent No.: US 9,139,217 B2
(45) Date of Patent: Sep. 22, 2015

(54) STEERING WHEEL

(75) Inventors: Olivier Bertrand, Courcôme (FR);
Hugues Doursoux, Latille (FR);
Laurent Groleau, Quincay (FR);
Patrick Guerin, Villiers (FR);
Emmanuelle Baloge, Rouille (FR)

(73) Assignee: Autoliv Development AB, Vargarda (SE)

( * ) Notice: Subject to any disclaimer, the term of this patent is extended or adjusted under 35 U.S.C. 154(b) by 40 days.

(21) Appl. No.: 14/009,493

(22) PCT Filed: Mar. 26, 2012

(86) PCT No.: PCT/SE2012/050328
§ 371 (c)(1),
(2), (4) Date: Oct. 2, 2013

(87) PCT Pub. No.: WO2012/138280
PCT Pub. Date: Oct. 11, 2012

(65) Prior Publication Data
US 2014/0026711 A1    Jan. 30, 2014

(30) Foreign Application Priority Data

Apr. 6, 2011   (EP) ..................... 11161394

(51) Int. Cl.
*B62D 1/06*        (2006.01)
(52) U.S. Cl.
CPC ............... *B62D 1/06* (2013.01); *Y10T 74/2087* (2015.01)
(58) Field of Classification Search
USPC .................................................. 74/552, 558
See application file for complete search history.

(56) References Cited

U.S. PATENT DOCUMENTS

| 3,576,139 A | * | 4/1971 | Conterno ..................... 74/552 |
| 5,205,186 A | * | 4/1993 | Draxlmaier, Sr. .............. 74/558 |
| 6,079,292 A | * | 6/2000 | Raetsen ........................ 74/558 |

(Continued)

FOREIGN PATENT DOCUMENTS

| DE | 10328988 A1 | 1/2005 |
| DE | 102008027777 B3 | 1/2010 |

(Continued)

OTHER PUBLICATIONS

International Search Report for PCT/SE2012/050328, ISA/SE, mailed May 11, 2012.
International Search Report for PCT/GB2012/000249, ISAS/EP, mailed Nov. 22, 2012.

*Primary Examiner* — Vicky Johnson
(74) *Attorney, Agent, or Firm* — Harness, Dickey & Pierce, P.L.C.

(57) ABSTRACT

A steering wheel has a rim having an armature encapsulated by a cover of resilient material. The cover has a fixing groove or recess formed therein so as to extend around the rim generally circumferentially with respect to the steering wheel. An outer skin is formed from flexible material and is provided over and around the cover such that two opposed edges of the outer skin are both positioned within the fixing groove or recess and fixed therein. The outer skin includes at least one seam terminating in a seam-end located along one of the opposed edges of the outer skin such that each edge of the outer skin positioned within the fixing groove or recess has at least one seam-end, and wherein each seam-end formed along one of the edges is circumferentially offset around the rim from each seam-end formed along the other edge.

20 Claims, 11 Drawing Sheets

(56) References Cited

U.S. PATENT DOCUMENTS

| | | | |
|---|---|---|---|
| 6,386,064 B1 * | 5/2002 | Hayakawa et al. | 74/558 |
| 6,644,145 B2 * | 11/2003 | Albayrak et al. | 74/552 |
| 6,668,683 B2 * | 12/2003 | Fleckenstein | 74/552 |
| 8,047,098 B2 * | 11/2011 | Park | 74/552 |
| 2009/0151506 A1 | 6/2009 | Haart et al. | |
| 2014/0013898 A1 * | 1/2014 | Doursoux et al. | 74/558 |

FOREIGN PATENT DOCUMENTS

| | | | | |
|---|---|---|---|---|
| EP | 1069023 A1 | 1/2001 | | |
| EP | 1964751 A2 | 9/2008 | | |
| GB | 980673 A | 1/1965 | | |
| GB | 1 398 685 | 6/1975 | | |
| JP | 04163277 A * | 6/1992 | | B62D 1/06 |

* cited by examiner

STEERING WHEEL

CROSS-REFERENCE TO RELATED APPLICATIONS

This application is a 371 U.S. National Stage of International Application No. PCT/SE2012/050328, filed Mar. 26, 2012, which claims priority to European Patent Application No. 11161394.2, filed Apr. 6, 2011. The disclosures of the above applications are entirely incorporated by reference herein.

FIELD

The present invention relates to a steering wheel, for example of the sort found in a motor vehicle.

BACKGROUND

Conventional steering wheels suitable for use in motor vehicles typically comprise a metal frame having a central boss from which one or more spokes extend in a generally radial direction. A generally circular or near-circular metal armature is supported by the radially outermost ends of the spokes in order to define part of a peripheral rim of the steering wheel, to be gripped by the driver of the vehicle. The armature is typically covered by a resilient covering, and the covering is finished with an outer skin. The outer skin is applied over the resilient covering to provide a visually and haptically pleasing peripheral surface to the steering wheel. It is conventional for the outer skin to be provided with a surface relief pattern of some sort, partly to improve the appearance and feel of the steering wheel, but also to provide an appropriate level of friction between the wheel and the hands of the driver to ensure the wheel can be properly gripped in use.

The external appearance of a motor vehicle steering wheel has a significant effect on the general feeling of wellbeing imparted to the driver of the vehicle and can thus play a role in a person's purchase decision when choosing a new car.

For these reasons, luxury, or so-called "premium" motor vehicles often have steering wheels whose rim is covered with leather or artificial leather. Conventional leather-covered steering wheels have their outer skins stitched around the rim. More particularly, the leather or artificial leather outer skin is provided with a plurality of spaced apart holes or eyes along its long sides, through which a fixing thread is stitched to secure the skin over and around the rim. The resulting line of stitching is usually formed on the rear of the rim, or radially inwardly so that it faces the central hub of the steering wheel. However, a significant disadvantage of this sort of arrangement is that its manufacture requires a large amount of manual work and is therefore complicated and expensive.

It is therefore an object of the present invention to provide an improved steering wheel suitable for use in a motor vehicle.

SUMMARY

According to the present invention, there is provided a steering wheel having a rim comprising an armature encapsulated by a cover of resilient material having a fixing groove or recess formed therein so as to extend around the rim generally circumferentially with respect to the steering wheel, the steering wheel further having an outer skin formed from flexible material and which is provided over and around the cover such that two opposed edges of the outer skin are both positioned within the fixing groove or recess and fixed therein, the steering wheel being characterised in that said outer skin comprises at least one seam terminating in a seam-end located along a said edge of the outer skin such that each edge of the outer skin positioned within the fixing groove has at least one said seam-end, and wherein the or each seam-end formed along one said edge is circumferentially offset around the rim from the or each seam-end formed along the other said edge.

Preferably, the outer skin is formed from a plurality of discrete interconnected panels.

Advantageously, said panels are interconnected by the or each said seam, the or each seam comprising overlapped regions of at least two discrete panels.

Conveniently, the outer skin comprises at least one locating formation on its rear surface, the or each locating formation being received within a respective locating groove or recess formed in the cover.

Preferably, the or each said seam defines a respective said locating formation, and the overlapped regions of said panels forming the or each seam are located in a respective locating groove or recess.

Advantageously, at least one said locating groove or recess intersects said fixing groove or recess and receives the or each respective said seam.

Preferably, at least one said locating groove or recess is formed around at least part of the radial cross-section of the rim.

Conveniently, another said locating groove or recess is formed around substantially the entire extent of the rim, circumferentially with respect to the steering wheel, and receives another seam interconnecting panels of the outer skin.

Preferably, the outer skin is formed of leather or artificial leather.

Advantageously, said cover is formed of plastic material and said opposed edges of the outer skin are fixed within the fixing groove or recess by ultrasonic welding.

Conveniently, the steering wheel further comprises a plastic insert engaged within the fixing groove or recess formed in the cover, and wherein said opposed edges of the outer skin are fixed to the insert by ultrasonic welding.

Preferably, the steering wheel further comprises a decorative element engaged with or otherwise affixed to the insert so as to substantially cover the or each edge of the outer skin positioned within the fixing groove or recess.

Advantageously, the decorative element is elongate.

Conveniently, the decorative element substantially conforms to the path of the fixing groove or recess around the rim of the steering wheel.

Preferably, the free ends of the decorative element are positioned generally adjacent one another and are covered by a second decorative element.

Preferably, the decorative element is flexible.

Advantageously, the decorative element is formed of plastic material.

Conveniently, the decorative element is formed by an extrusion process. Alternatively, the decorative element may be injection moulded.

Preferably, the decorative element is clipped to the insert or engaged with the insert as an interference fit.

Advantageously, the decorative element has a chromatic surface.

So that the invention may be more readily understood, and so that further features thereof may be appreciated, embodiments of the invention will now be described by way of example with reference to the accompanying drawings in which:

DETAILED DESCRIPTION

Figure 1:
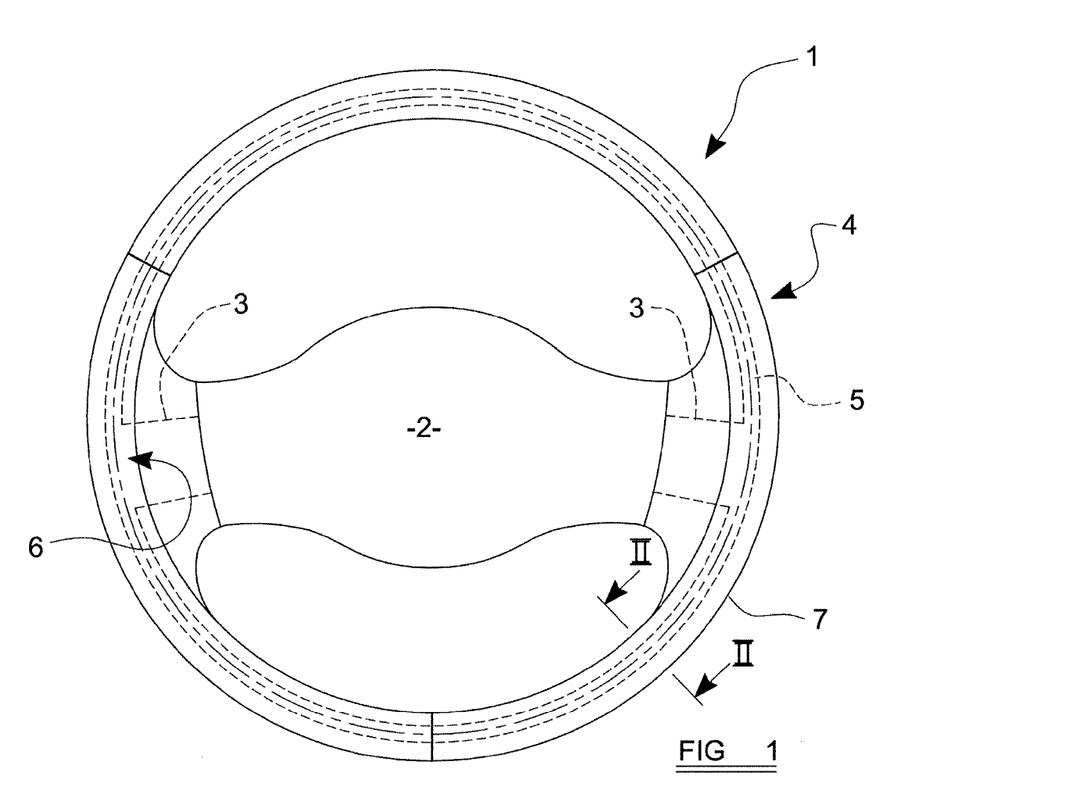
FIG. 1 is a schematic part sectional illustration of a steering wheel frame.

Referring initially to FIG. 1 of the drawings, there is illustrated a steering wheel 1 comprising a central hub 2 from which a plurality of spokes 3 extend substantially radially, the spokes supporting an outer rim 4. The particular steering wheel illustrated comprises two spokes 3, but it should be appreciated that steering wheels in accordance with the invention could comprise more spokes than this, or could even comprise just a single spoke. More particularly, it is to be noted that the radially outermost ends of the spokes 3 support a generally circular or approximately circular metal armature 5 (illustrated in dashed lines in FIG. 1). Together, the hub 2, spokes 3, and armature 5 of the steering wheel can be considered to form an integral frame. The armature 5, and optionally at least a region of the spokes 3 (which together may be considered to represent a gripping portion of the wheel suitable to be gripped by the driver), may be provided with a foam or plastic cover 6. The cover 6 may be formed from foamed material such as, for example polyurethane foam or expanded polypropylene, or may be formed from a suitable thermoplastic material. In the arrangement illustrated in FIG. 1, the cover 6 serves to completely encapsulate the underlying armature 5 whilst also cover the radially outermost region of each spoke 3. As thus far described, the steering wheel 1 is generally conventional.

As will be described in more detail below, the cover 6 is wrapped with an outer skin 7. The present invention most particularly concerns the manner in which the outer skin 7 is affixed to the gripping portion of the steering wheel. The outer skin 7 takes the form of a relatively thin flexible sheet, and is preferably either natural leather or artificial leather having similar visual and haptic properties to natural leather.

Figure 2:
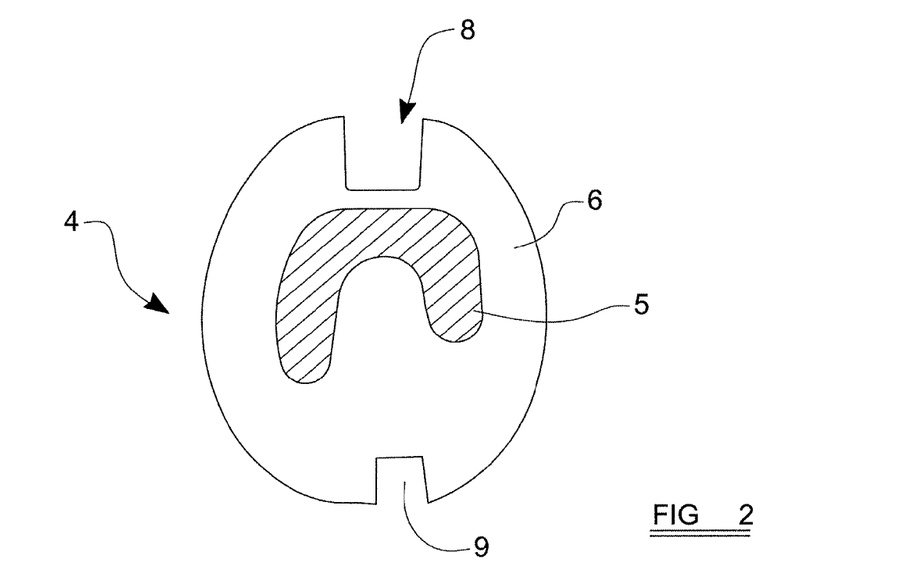
FIG. 2 is a radial cross-sectional view taken along line II-II on FIG. 1, through the rim of the steering wheel.

FIG. 2 shows a cross-section through the rim 4 of the steering wheel, taken along line II-II in FIG. 2, but with the outer skin 7 omitted. As will be seen, the central armature 5 has a generally U-shaped profile in radial cross-section. This profile is not essential to the invention however. As mentioned above, the armature 5 is encapsulated by the cover 6 which has a generally circular or slightly ovoid radial cross-section.

A fixing groove 8 is formed in the cover 6. The fixing groove 8 has a substantially square or rectangular cross-sectional profile and preferably extends around substantially the entire extent of the rim 4, generally circumferentially with respect to the steering wheel as illustrated most clearly in FIG. 3. In the case of the particular steering wheel illustrated, the fixing groove 8 is formed around a front region of the rim 4 (i.e. a region of the rim which will face the driver of the vehicle). However, it is envisaged that in other embodiments the fixing groove could be provided elsewhere about the radial cross-section of the rim 4, for example on the outside or perhaps on the rear part, facing away from the driver. The fixing groove 8 is open along its entire length.

FIG. 2 also shows a first locating groove 9 formed in the cover 6. The locating groove 9 also has a substantially square or rectangular cross-sectional profile and preferably extends around substantially the entire extent of the rim 4, generally circumferentially with respect to the steering wheel as illustrated most clearly in FIG. 3. In the case of the particular steering wheel illustrated, the locating groove 9 is formed around a rear region of the rim 4 (i.e. a region of the rim which will face away from the driver of the vehicle) and is thus diametrically opposed to the fixing groove 8 across the rim 4. However, it is envisaged that in other embodiments the locating groove 9 could be provided elsewhere about the radial cross-section of the rim 4. The locating groove 9 is open along its entire length and preferably has a somewhat smaller cross-sectional profile than the fixing groove 8.

Figure 3:
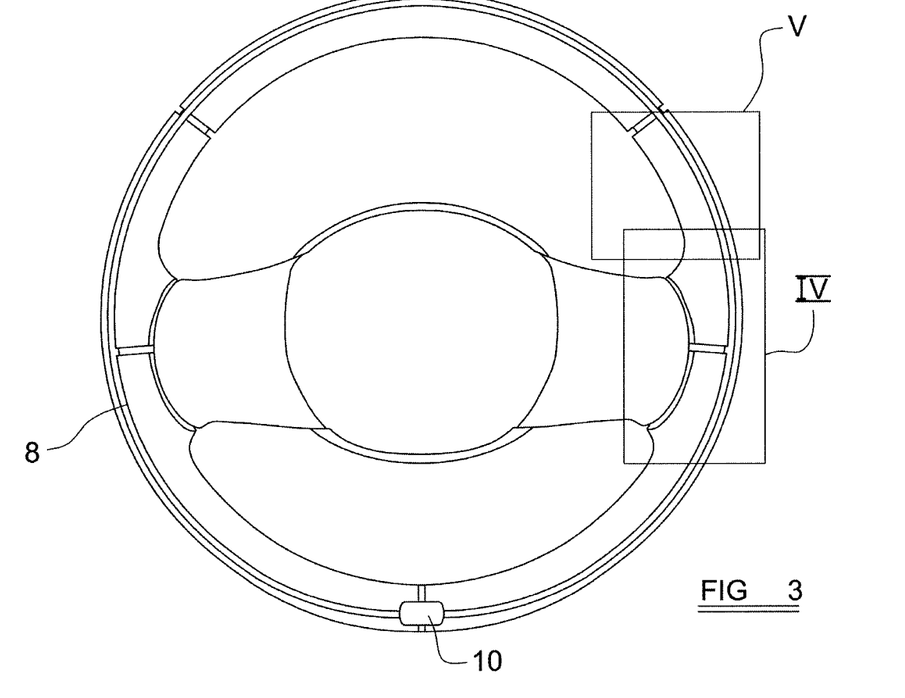
FIG. 3 shows the steering wheel, partially assembled and as viewed from the front.

As shown in FIG. 3, an enlarged recess 10 may be provided within the outer cover 6, at a position along the fixing groove 8. In the particular configuration of steering wheel illustrated, the recess 10 is located at the "six o'clock position" around the rim 4. The fixing groove 8 thus effectively runs from one side of the recess 10, around the rim 4, and back to the other side of the recess 10.

Figure 4:
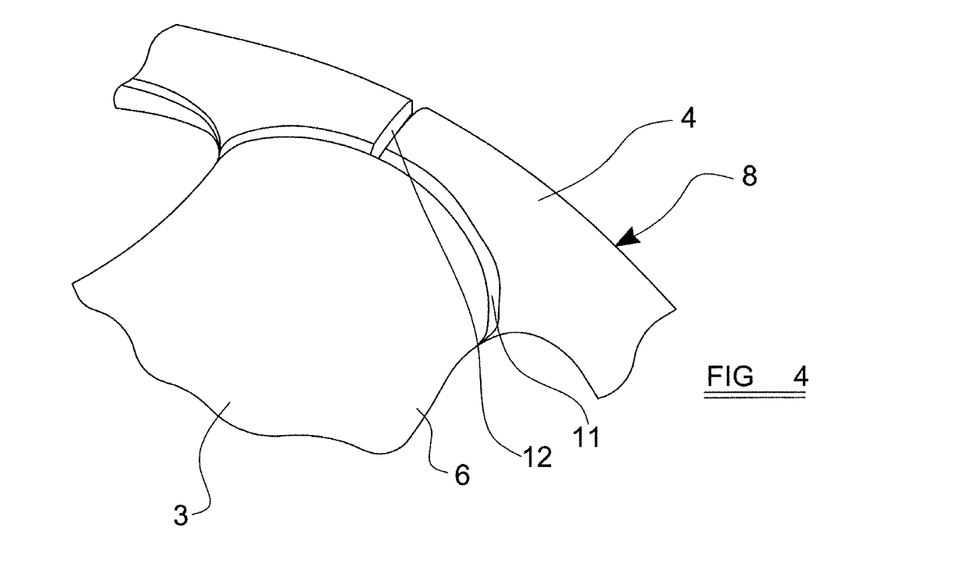
FIG. 4 is an enlarged perspective view of region IV of FIG. 3, showing a front region at which the rim of the steering wheel joins a spoke.
Figure 7:
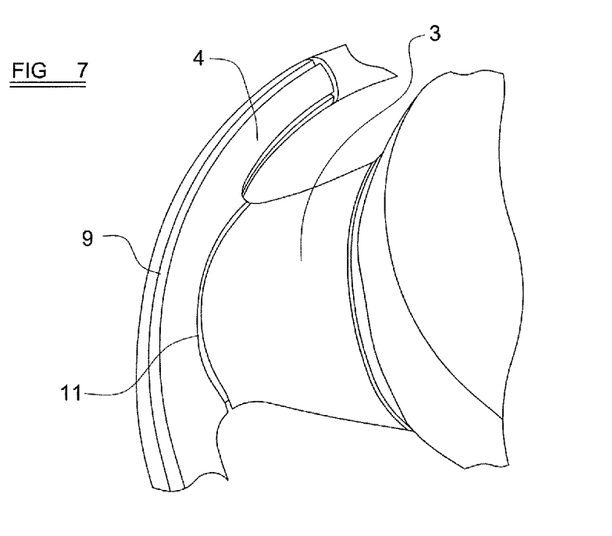
FIG. 7 is an enlarged perspective view of region VII of FIG. 6, showing a rear region at which the rim of the steering wheel joins a spoke.

FIG. 4 shows in detail the region IV of the steering wheel 1 denoted in FIG. 3, and thus shows the intersection between a spoke 3 and the rim 4. As indicated above, the foam covering 6 also extends over the spoke 3 and this is clearly shown in FIG. 4. FIG. 4 also shows two finishing grooves formed in the foam cover 6. The first of these is a groove 11 which extends in a generally arcuate manner around the intersection between the spoke 3 and the rim 4 of the steering wheel. FIG. 7 shows the section of this groove which passes round the rear part of the spoke 3. The second finishing groove 12 runs in a generally radial direction relative the steering wheel as a whole, and extends across the front part of the rim 4 from the mid-point (or thereabouts) of the first finishing groove 11 on the front of the wheel to the fixing groove 8. Each spoke of the steering wheel has a respective first groove 11 formed around its foam covering 6, and also a respective second groove 12.

Figure 5:
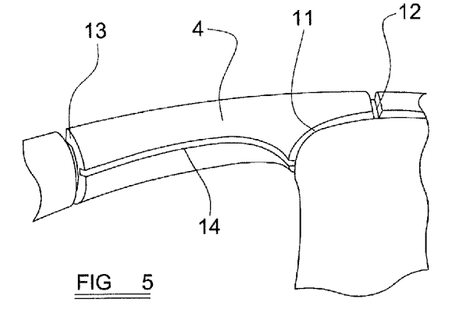
FIG. 5 is an enlarged perspective view of region V of FIG. 3, showing an inner region of the rim of the steering wheel.
Figure 6:
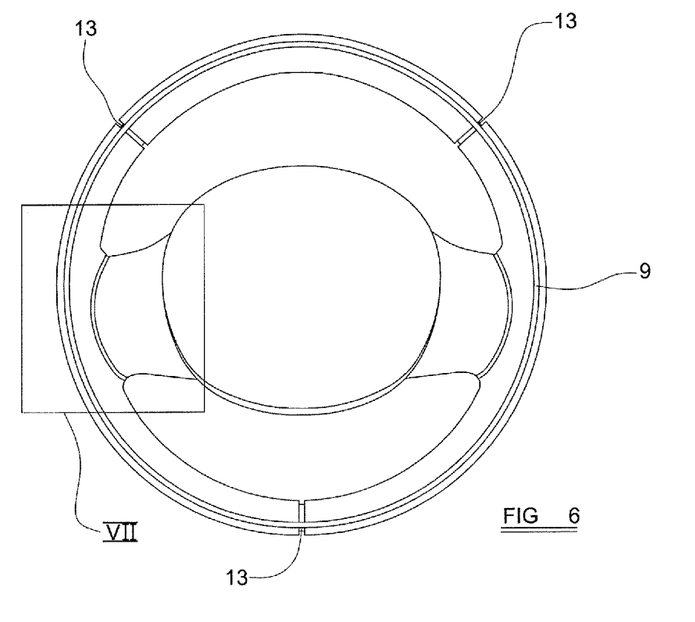
FIG. 6 shows the steering wheel, partially assembled and as viewed from the rear.

FIG. 5 shows in detail the region V of the steering wheel 1 denoted in FIG. 3, and thus shows the radially inwardly facing region of the rim 4, adjacent the spoke 3. Spaced a short distance from the intersection between the rim 4 and the spoke 4, there is provided a second locating groove 13 which is formed in the cover 6 and which extends around the radial cross-section of the rim 4. The steering wheel 1 may be provided with a plurality of these radial locating grooves 13, for example as shown in FIG. 6 in which the steering wheel has three such grooves spaced around its rim 4. A third locating groove 14 is also provided, the third locating groove 14 being formed in the cover 6 around the inner part of the rim 4 and which extends from the second locating groove to the groove 11 formed around the end of the spoke 3.

Figure 8:
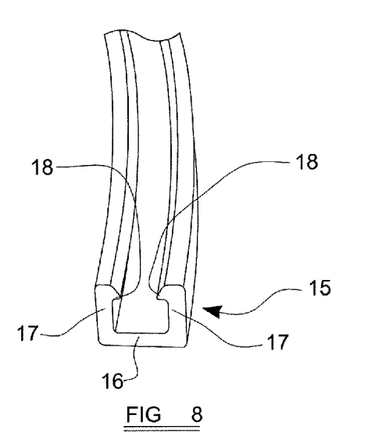
FIG. 8 is a perspective view showing an insert element forming part of the steering wheel of the present invention.

Turning now to consider FIG. 8, there is shown a plastic insert element 15. The plastic insert element takes the form of an elongate open channel of generally U-shaped cross-section having a base 16 supporting a pair of upstanding spaced-apart side-walls 17. Each side-wall 17 terminates with an inwardly directed projection 18 in the form of a gripping tooth or the like. The insert 15 is preferably flexible along its length and its side-walls are resiliently deformable. The insert 15 may be formed via a plastic extrusion process and from any suitable plastics material providing that the material is susceptible to melting and fusion upon application of ultrasonic energy. However, it is currently proposed to form the insert element 15 via an injection moulding process, in which case it is proposed that the insert 15 will have a pre-formed ring shape, in its relaxed condition, corresponding to the path of the fixing groove 8.

Figure 9:
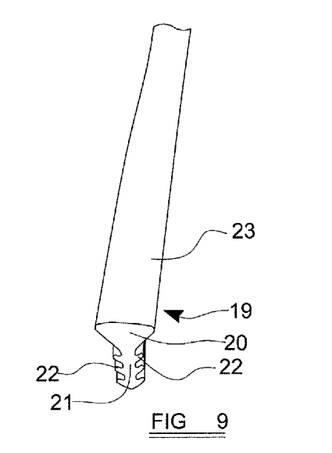
FIG. 9 is a perspective view showing a decorative element forming part of the steering wheel.

FIG. 9 shows an elongate decorative element 19. The decorative element 19 can be formed from metal, plastic, or indeed any other suitable material deemed to provide a suitable visual appearance within the context of a motor vehicle cabin. However, it is currently proposed to form the decorative element from plastics material via an injection moulding process.

The decorative element 19 illustrated has a generally T-shaped cross-sectional profile comprising a head portion 20 from which a shank portion 21 depends. The shank portion 21 has a plurality of gripping formations which preferably take the form of outwardly directed projections 22. The head portion 20 has an outwardly presented surface 23 which is configured to have appropriate visual and haptic properties for the vehicle in which the steering wheel is intended to be used. For example, the outer surface 23 may have a matt finish, a gloss finish, and/or may be chromatic.

It should be appreciated, however, that the decorative element 19 can be provided in alternative configurations and may, for example, have a generally rectangular cross-sectional profile without the gripping formations. It is proposed to pre-from the decorative element 19 into a shape corresponding to the path of the fixing groove 8, which in the arrangement illustrated involves pre-forming the decorative element 19 into the shape of a ring.

Figure 10:
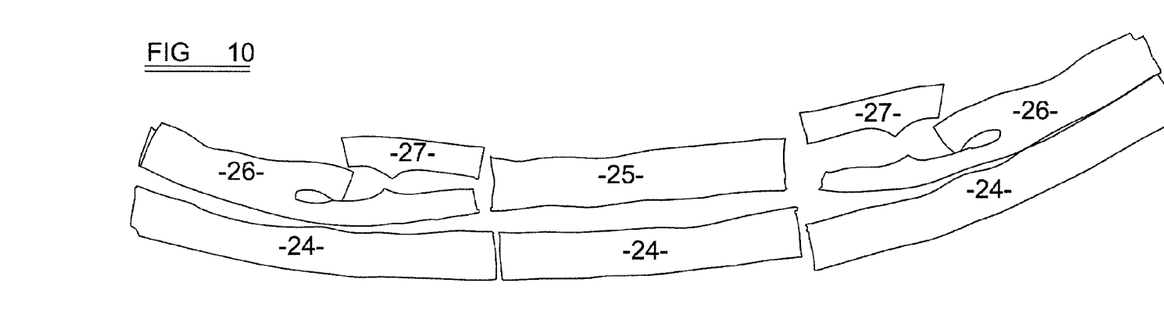
FIG. 10 is a plan view from above, showing a plurality of panels used to form an outer skin of the steering wheel.

Turning now to consider FIGS. 10 to 13, the construction of the outer skin 7 of the steering wheel will be described. FIG. 10 shows a plurality of individual panels which have been cut from a sheet of leather or artificial leather. The panels include three rectangular outer panels 24 (in the sense that they will ultimately be wrapped over respective radially outwardly directed parts of the rim 4), and a single rectangular inner panel 25. Shown located on each side of the rectangular inner panel 25 are a pair of mirror-symmetrical large inner panels 26 and a pair of respective mirror-symmetrical small inner panels 27. In a manner known per se, the mirror-symmetrical panels 26, 27 each have a somewhat complicated shape comprising arcuate edges such that they will fit around the rim 4 of the steering wheel in the region where it meets the spokes 3.

Figures 11, 12, 13:
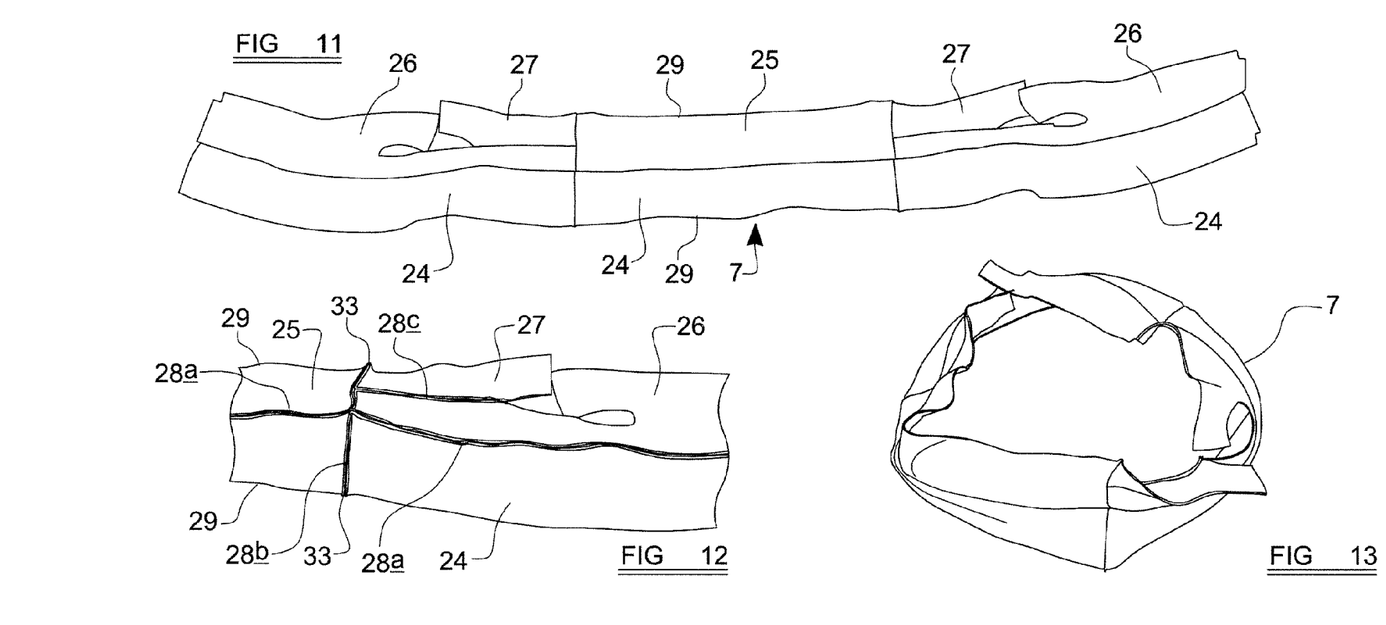
FIG. 11 is a plan view from above, showing the panels illustrated in FIG. 10 interconnected to form a flexible outer skin for the steering wheel.
FIG. 12 is an enlarged view of the part of the outer skin, showing a series of seams interconnecting the panels.
FIG. 13 is a perspective view of the outer skin ready for application over a gripping part of the steering wheel.

FIG. 11 shows the panels 24-27 of FIG. 10 interconnected to one another along abutting edge regions so as to form a single elongate skin 7. FIG. 12 shows a region of the resulting skin 7 as viewed from the rear side, and thus shows the manner in which the panels are interconnected along their edges. As is generally conventional, the edge regions of adjoining panels are overlapped and then stitched together to form a series of stitched seams 28 on the rear side of the skin 7. Each resulting seam 28 thus projects rearwardly from the skin 7. As will be described below, the projecting seams 28 serve a locating function as the skin 7 is applied over the foam cover 7. The seams 28 can thus be considered to represent locating formations.

FIG. 13 illustrates the generally elongate skin 7 shown in FIG. 11 after its two ends are interconnected to one another by another stitched seam to from the completed skin ready for application to the rim of the steering wheel.

Figure 14:
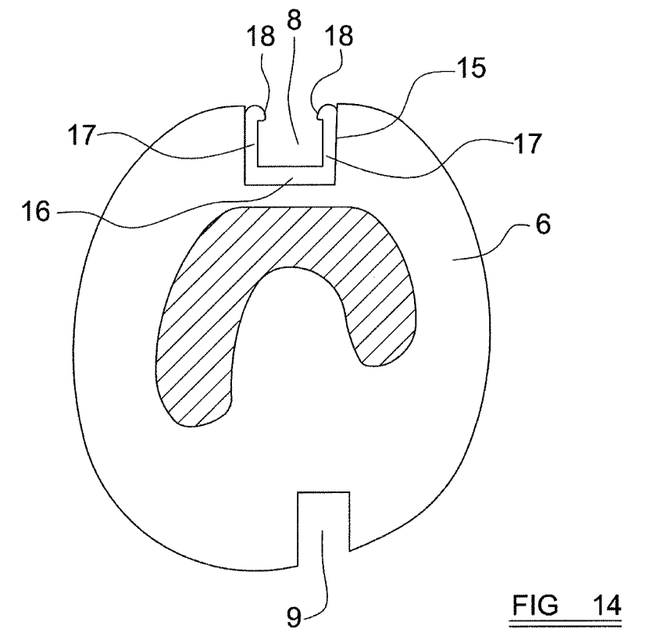
FIG. 14 is a view corresponding generally to that of FIG. 2, showing the insert of 8 engaged within a groove formed in the rim of the steering wheel.

So, turning now to consider FIG. 14, the plastic insert 15 is inserted and engaged within the fixing groove 8 formed in the foam cover 6 around the rim of the steering wheel. More particularly, it will be noted that the insert 15 is pressed fully into the groove 8 such that the base 16 of the insert bears against the bottom surface of the groove and such that the side-walls 17 of the insert bear against the respective sides of the groove. In this position, the inwardly directed projections 18 become located slightly inwardly of the outer surface of the cover 6.

As indicated above, the insert 15 may be flexible and so can be manipulated so as to conform to the path of the fixing groove 8 all around the rim 4. However, in alternative arrangements it may be more convenient to pre-form the insert such that it has a shape generally corresponding to the path of the fixing groove 8.

Preferably, the insert 15 is received in the fixing groove 8 as an interference fit, resulting from the combined effect of the inherent resilience of the foam material forming the cover 6 and the resiliency of the side-walls 17 of the insert. For this purpose it is proposed that the width of the insert 15 in its relaxed condition may be slightly greater than the width of the undeformed groove 8.

Once the insert 15 has been positioned in the groove 8 as described above and pressed substantially fully home therein, the outer skin 7 can be offered up to the rim for application thereto.

Figure 15:
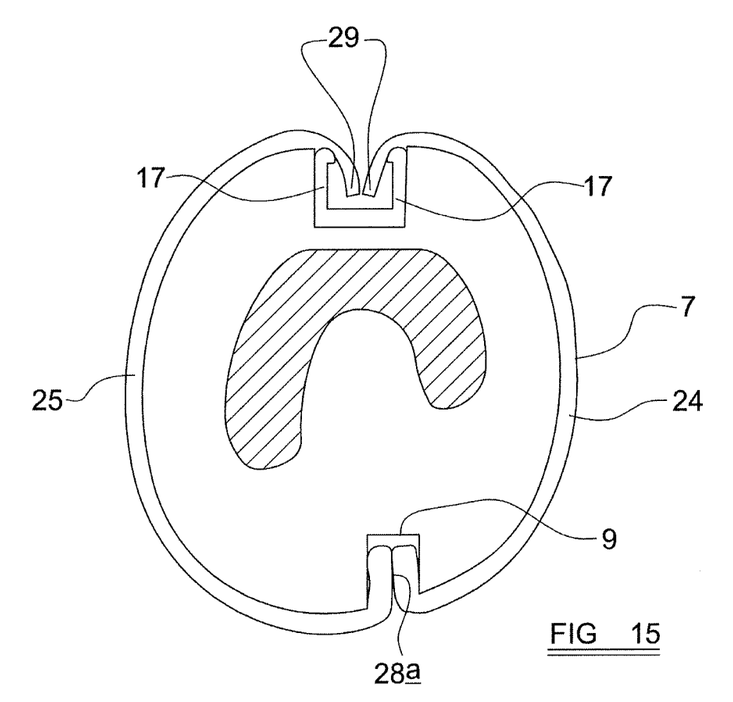
FIG. 15 shows a stage in the application of the outer skin illustrated in FIGS. 10 to 13 to the rim of the steering wheel.

FIG. 15 shows an initial stage in the application of the skin 7 to the rim 4 of the steering wheel. The skin 7 is located relative to the rim 4 by pressing each seam 28 into a respective locating groove 9, 13, 14. It is proposed that firstly the relatively long seams 28a which interconnect the outer panels 24 and the inner panels 25, 26 of the skin 7 will be pressed into the first locating groove 9 running around the rim as illustrated in FIG. 15. Thereafter, the radial seams 28b (see FIG. 12) and the short seams 28c interconnecting the panels 26, 27 can be pressed into the second and third locating grooves 13, 14 (shown in FIG. 5) respectively.

The various panels of the outer skin 7 are then drawn across and around the cover 6 as illustrated in FIG. 15. The opposing free edges 29 of the panels thus become aligned over the fixing channel 8 at the front of the rim. The free edges are then pressed inwardly such that they become located within the fixing groove 8 and more particularly within the insert 15 therein, as illustrated in FIG. 15.

Figure 16:
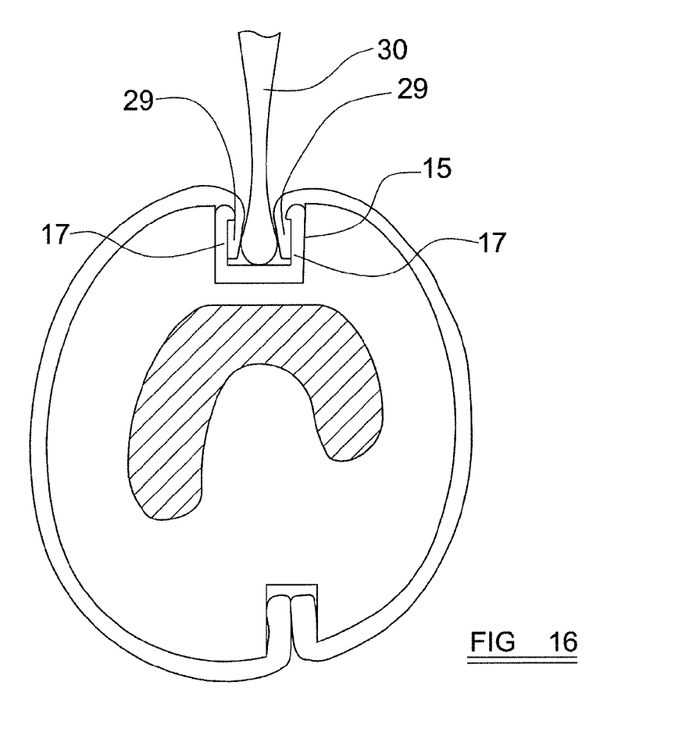
FIG. 16 shows a subsequent stage in the application of the outer skin to the rim.

As illustrated schematically in FIG. 16, the free edges 29 of the outer skin 7 are in fact pressed into the plastic insert 15 by the head 30 of an ultrasonic tool. The head 30 thus serves as a sonotrode and when energised serves to ultrasonically weld the edges 29 of the skin to the side-walls 17 of the plastic insert. More particularly, the localised application of ultrasonic energy from the sonotrode 30 serves to melt the plastic of the insert, and in particular its side-walls 17, such that the plastic flows locally into the irregularities or intertices in the surface of the skin material. When the plastic subsequently solidifies, it grips onto the leather by virtue of its extension into the irregularities or intertices.

Figure 17:
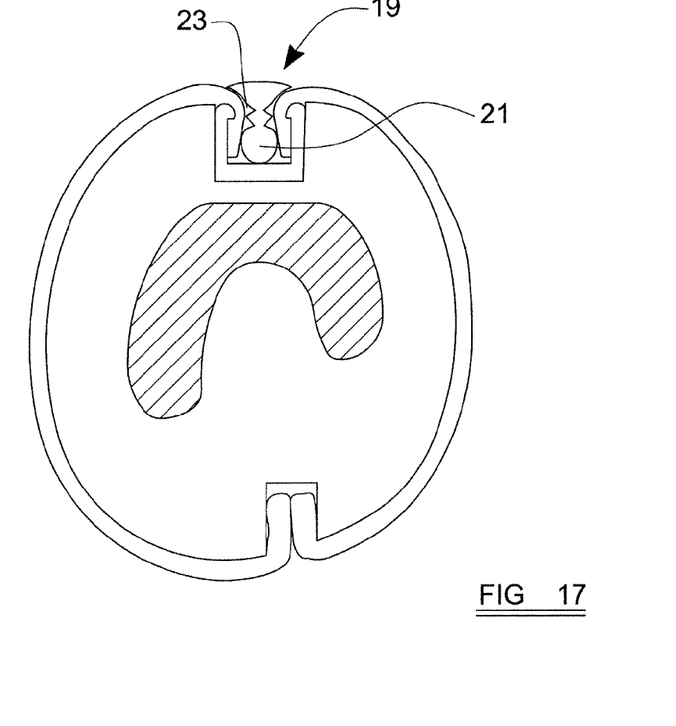
FIG. 17 shows the decorative element of FIG. 9 fitted to the insert of FIG. 8 in the rim of the steering wheel.

As will be appreciated, the appearance of the resulting ultrasonic weld formed along the fixing groove 8 in this manner can be unsightly. The decorative insert 19 is thus then inserted into the groove 8, and more particularly between the welded edges 29 of the outer skin 7. As illustrated in FIG. 17, the decorative insert is pressed into the groove 8 such that its shank portion 21 passes between the edges 29 of the skin 7. As will be appreciated, the outwardly direction projections 22 of the decorative element engage and grip the adjacent edge regions of the outer skin 7 to retain the decorative element in position. Additionally, however, the decorative element may be clipped or engaged with the insert 14 for additional security. Alternatively, in the event that the decorative element 19 is formed from suitable plastics material, it can be ultrasonically welded to the base 15 of the plastic insert 15, via a second welding step. Indeed, it is envisaged that an ultrasonic weld formed in this way between the insert 15 and the decorative element 19 would facilitate the omission of the gripping projections 22 shown in the drawings.

As illustrated in FIG. 17, with the decorative element 19 inserted into the fixing groove 8 as described above, the head part 20 of the element covers, and hence hides the unsightly weld formed between the plastic insert and the edges of the skin within the groove. The outer surface 23 of the decorative insert is thus presented to the driver of the motor vehicle.

Figure 18:
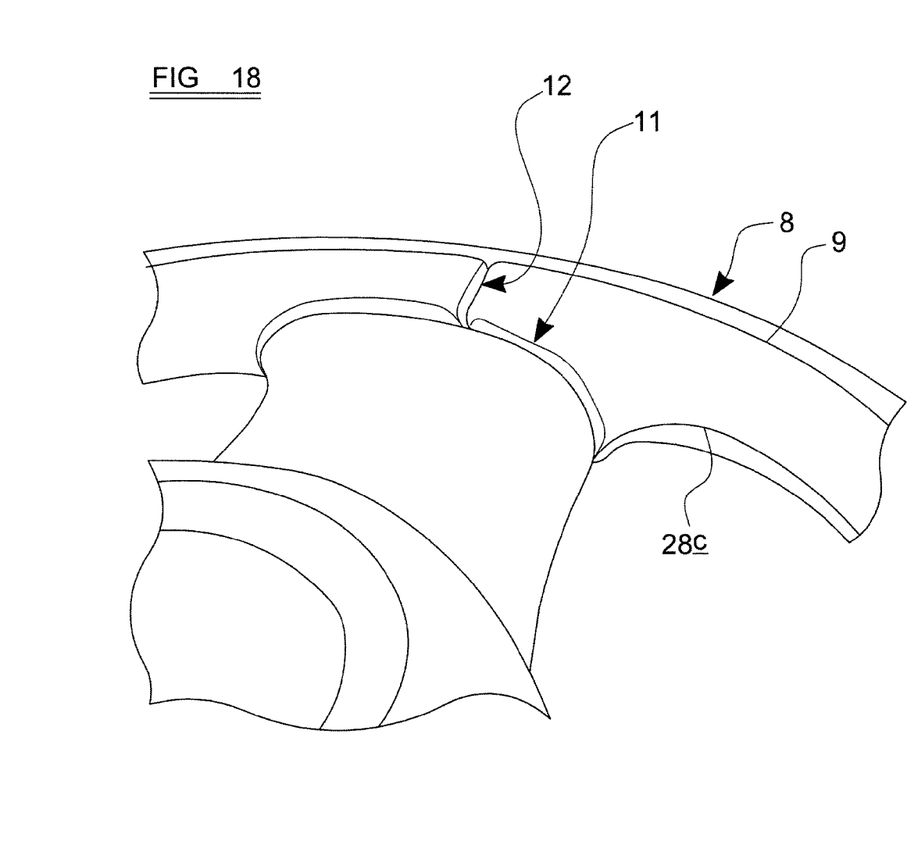
FIG. 18 is a perspective view showing in detail part of the finished steering wheel, as viewed from the front.
Figure 19:
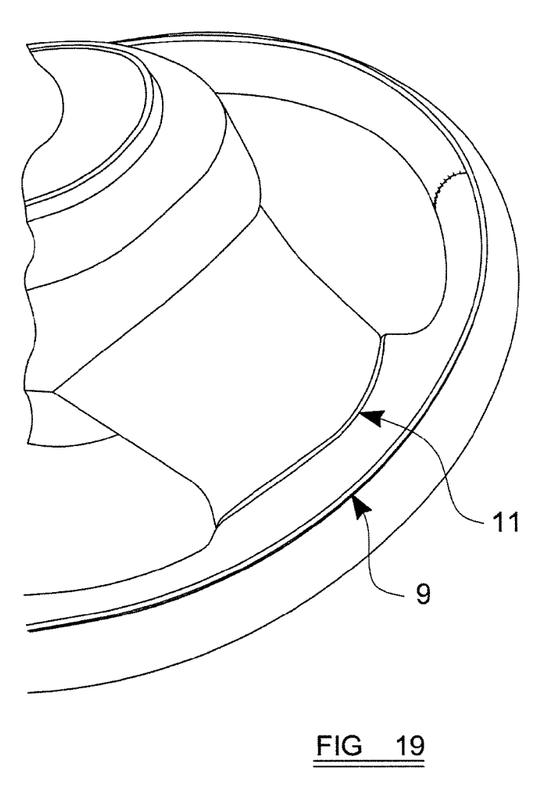
FIG. 19 is a perspective view showing in detail another part of the finished steering wheel, as viewed from the rear.

Following fixture of the outer skin 7 within the fixing groove 8 as described above, the remaining free edges of the panels 26 and 27 of the skin are simply pressed into the finishing grooves 11, 12 as shown in FIGS. 18 and 19.

Figure 20:
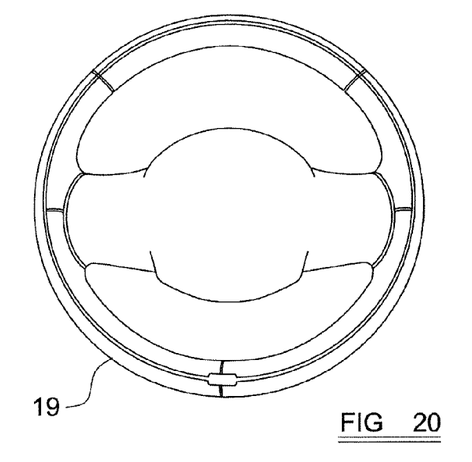
FIG. 20 is illustrates the finished steering wheel as viewed from the front.
Figure 21:
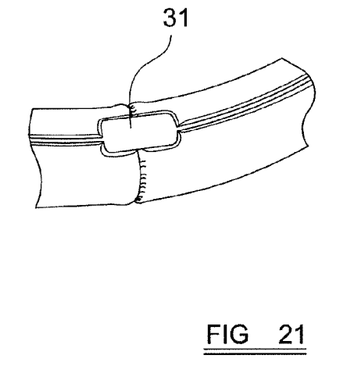
FIG. 21 is an enlarged view of region XXI in FIG. 20.

FIG. 20 shows the finished steering wheel 1 as viewed from the front (as the driver would view it), and thus clearly shows the decorative element extending around the rim of the wheel. As shown in FIG. 21, a second decorative element 31 is received within the recess 10 at the six o'clock position of the wheel, and thus serves to cover and hide the adjacent free ends of the elongate decorative element 19.

Figure 22:
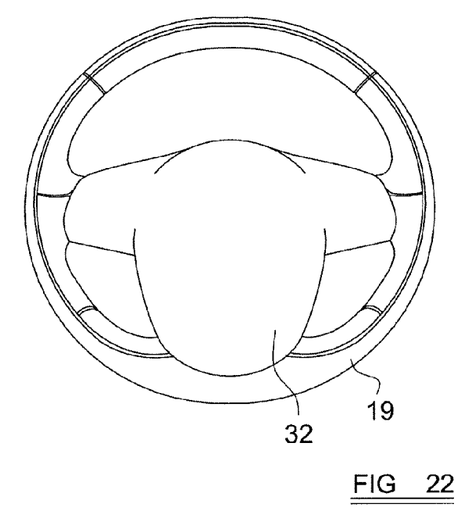
FIG. 22 illustrates a steering wheel of an alternative arrangement.

FIG. 22 illustrates an alternative arrangement in which the free ends of the decorative element 19 are covered and hidden by part of a trim element 32 which is fitted to the hub of the steering wheel and which extends downwardly to the rim 4 in the manner of another spoke.

Figure 23:
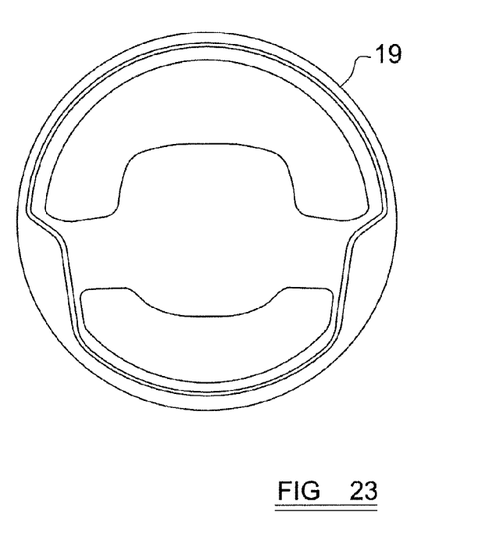
FIG. 23 illustrates a steering wheel of another alternative arrangement.

FIG. 23 illustrates another alternative embodiment in which the fixing groove 8, and hence also the cooperative decorative element 19 follow a somewhat serpentine path around the front part of the rim 4.

As explained above, each of the seams 28 interconnecting adjacent panels of the outer skin 7 comprise overlapped edge regions of the panels which are stitched together. The seams 28 thus include a double-thickness of skin material, and are thus significantly thicker than the rest of the panels. As illustrated in FIG. 12, it can be the case that at least one seam terminates with a seam-end 33 located along one of the opposed edges 29 of the skin 7. In the panel configuration illustrated in FIG. 12, the radial seam 28b terminates at each end with a respective seam-end 33, and each of these seam-ends is located along a respective edge 29 of the outer skin 7.

In the case of the specific arrangement described above, the radial seam 28b is located in the second locating groove 13 shown in FIG. 5 as the outer skin 7 is applied to the rim of the steering wheel in the manner described above. Of course, the second locating groove 13 extends around the radial cross-section of the rim 4. This means that when the skin 7 is applied over the cover 6 such that the radial seam 28b is located in the second locating groove 13 and the opposed edges 29 of the skin 7 positioned within the insert 15 in the fixing groove 8, then at the intersection of the two grooves 13, 15 there are actually four thicknesses of skin material. This can make it difficult to arrange the skin 7 neatly without unsightly creases, and can also make it difficult to ultrasonically weld the opposed edges 29, in the region of the seam ends 33, to the insert 15. It is therefore proposed, in variants of the arrangement described above, to avoid panel patterns for the outer skin 7 which give rise to the coincidence of two seam-ends 33 when the opposed edges 29 of the skin are positioned within the insert 15. Indeed, this aspect of the invention can also be useful even in the absence of the insert 15, such as in the case of the cover 6 itself being formed of thermoplastic material susceptible to melting upon the application of ultrasonic energy. It is therefore to be appreciated that the alternative seam-configurations described below could be used in an arrangement in which the insert 15 is omitted and instead the opposed edges 29 of the outer skin are positioned directly within the fixing groove 8 of the cover 6 and fixed thereto by ultrasonic welding.

Figure 24:
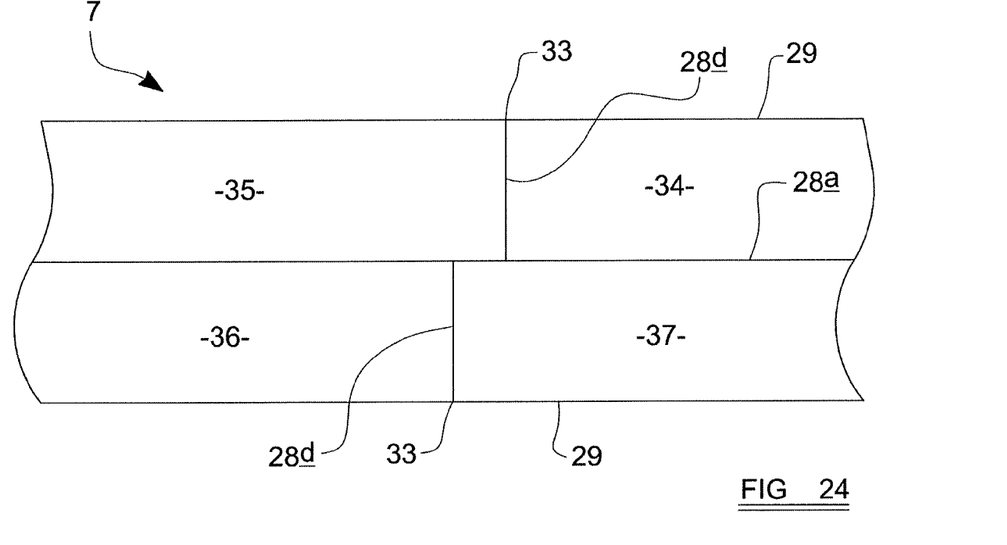
FIG. 24 illustrates part of an alternative pattern of panels used to form the outer skin.
Figure 25:
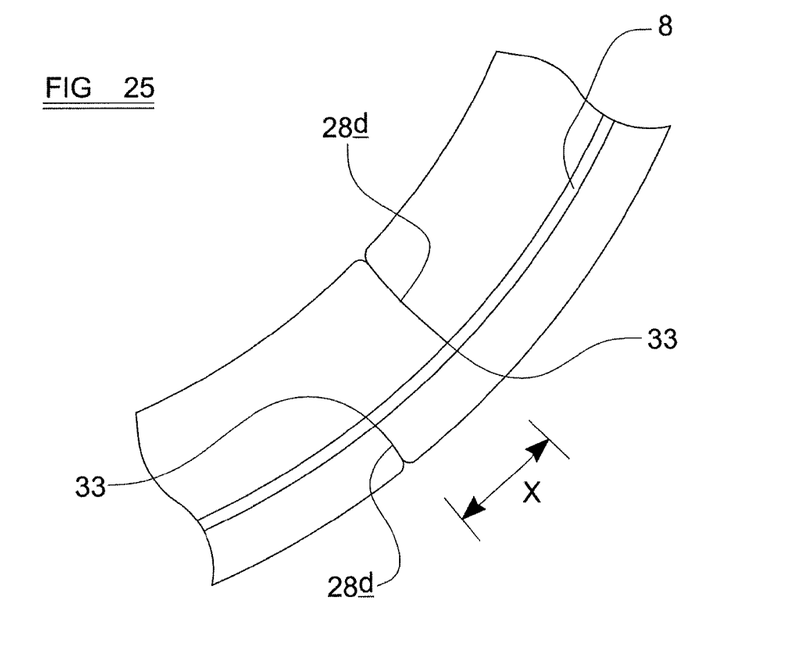
FIG. 25 illustrates part of the rim of a steering wheel having an outer skin with the panel pattern of FIG. 24.

FIG. 24 illustrates an alternative panel pattern designed to overcome the problem mentioned above. As will be noted, four discrete panels 34, 35, 36, 37 are interconnected by seams. A longitudinal seam 28a is created as in the arrangements described above for location within the first locating groove 9 formed around the rim 4. However, in this arrangement, the single radial seam 28b has been replaced by a pair of shorter radial seams 28d, each of which serves to interconnect a respective pair of the panels in end-to-end relationship, and which runs from the longitudinal seam 28a to respective seam-end 33 located along a respective edge 29 of the skin 7. As will be noted, the two seams 28d are offset relative to one another along the length of the outer skin 7. The seams 28d will thus each need to be received within a respective locating groove, but when the outer skin 7 is wrapped around the cover such that the edges 29 become positioned within the fixing groove 8 or the insert 15, the two seam-ends 33 will be circumferentially offset from one another around the rim of the steering wheel as denoted by x in FIG. 25, thereby avoiding the creation of localised regions along the fixing groove in which there are bunched four thicknesses of the skin material. At the position of each seam-end 33 along the fixing groove 8, there will be three thicknesses of material; two contributed by the respective seam 28d itself, and one contributed by the opposing edge 29 of the skin 7.

Figure 26:
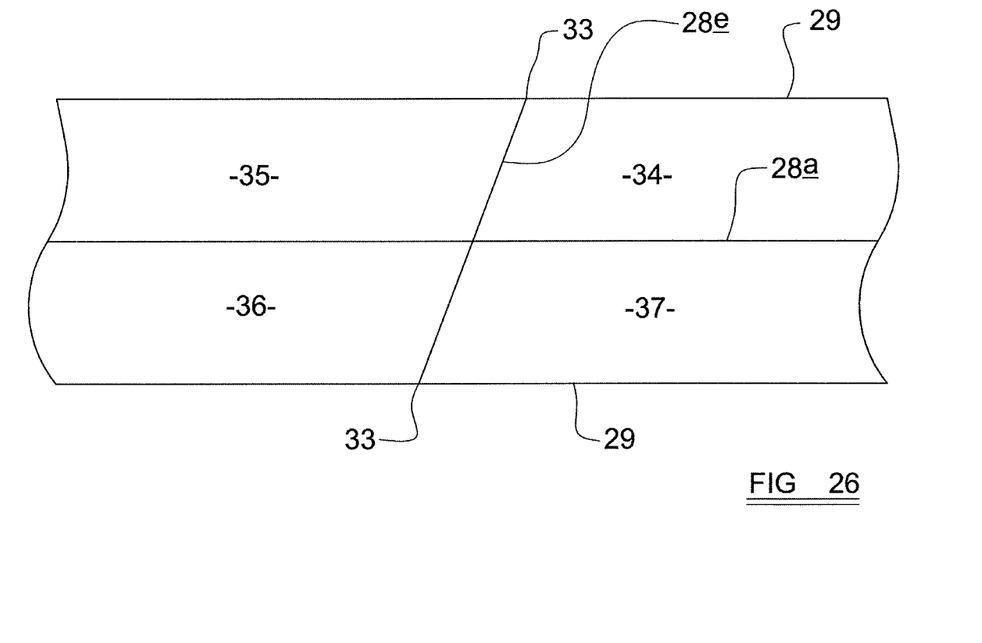
FIG. 26 illustrates part of another alternative pattern of panels used to form the outer skin.
Figure 27:
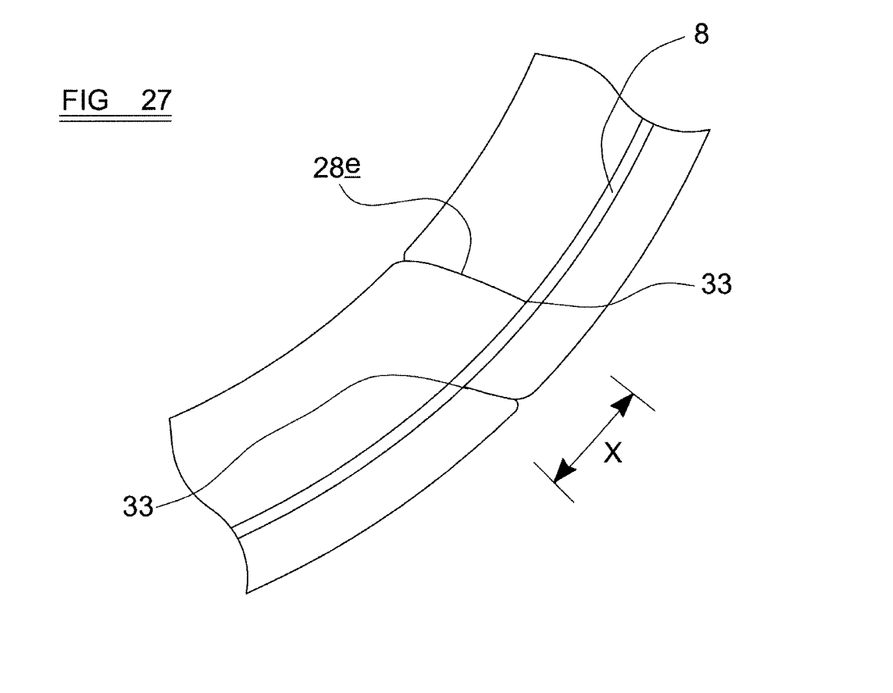
FIG. 27 illustrates part of the rim of a steering wheel having an outer skin with the panel pattern of FIG. 26.

FIG. 26 illustrates another alternative panel pattern in accordance with this aspect of the invention, in which the two offset radial seams 28d are replaced with a single oblique seam 28e running from a first seam-end along on edge 29 to another seam-end along the opposite edge 29. As will be appreciated, this arrangement will require the provision of a locating groove in the cover 6 which is configured to follow a helical turn around the cross-section of the rim 4, but otherwise the effect of this arrangement will be generally identical to that of the arrangement shown in FIG. 24 in circumferentially offsetting the two-seam ends around the rim, as illustrated in FIG. 27, and thereby avoiding the creation of any bunches of four thicknesses of skin material along the fixing groove 8.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A steering wheel comprising:
   a rim having an armature encapsulated by a cover of resilient material having a fixing groove or recess formed therein so as to extend around the rim generally circumferentially with respect to the steering wheel;
   an outer skin formed from a flexible material and provided over and around the cover such that first and second laterally opposed edges of the outer skin are both positioned within the fixing groove or recess and fixed therein, the outer skin having at least one radial seam, the at least one radial seam including at least one first seam-end located along the first laterally opposed edge and at least one second seam-end located along the edge of the outer skin, each of the at least one first seam end and the at least one second seam end located in the fixing groove or recess;
   wherein each first seam-end formed along the first laterally opposed edge is circumferentially offset around the rim from each second seam-end formed along the second laterally opposed edge.

2. The steering wheel according to claim 1, wherein the outer skin is formed from a plurality of discrete interconnected panels.

3. The steering wheel according to claim 2, wherein the panels are interconnected by the at least one radial seam, each radial seam including overlapped regions of at least two discrete panels.

4. The steering wheel according to claim 1, wherein the outer skin includes at least one locating formation on a rear surface thereof, each locating formation being received within a respective locating groove or recess formed in the cover.

5. The steering wheel according to claim 4, wherein each radial seam defines a respective locating formation, and the overlapped regions of the panels forming each radial seam are located in a respective locating groove or recess.

6. The steering wheel according to claim 5, wherein at least one locating groove or recess intersects the fixing groove or recess and receives each respective radial seam.

7. The steering wheel according to claim 6, wherein at least one locating groove or recess is formed around at least part of the radial cross-section of the rim.

8. The steering wheel according to claim 1, wherein the outer skin is formed of leather or artificial leather.

9. The steering wheel according to claim 1, wherein cover is formed of thermoplastic material and the opposed edges of the outer skin are fixed within the fixing groove or recess by ultrasonic welding.

10. The steering wheel according to claim 1, further comprising a plastic insert engaged within the fixing groove or recess formed in the cover, and wherein the opposed edges of the outer skin are fixed to the insert by ultrasonic welding.

11. The steering wheel according to claim 10, further comprising a decorative element engaged with or otherwise affixed to the insert so as to substantially cover the first and second laterally opposed edges or of the outer skin positioned within the fixing groove or recess.

12. The steering wheel according to claim 11, wherein the decorative element is elongate.

13. The steering wheel according to claim 12, wherein the decorative element substantially conforms to a path of the fixing groove or recess around the rim of the steering wheel.

14. The steering wheel according to claim 13, wherein free ends of the decorative element are positioned generally adjacent one another and are covered by a second decorative element.

15. A steering wheel comprising:
   a rim having an armature encapsulated by a cover of resilient material having a first groove formed therein extending around the rim generally circumferentially with respect to the steering wheel;
   an outer skin formed from a flexible material, including first and second laterally opposed edges and provided over and around the cover such that first and second laterally opposed edges of the outer skin are both positioned within the first groove and fixed therein, the outer skin having at east one radial seam, the at least one radial seam including at least one first seam-end located along the first laterally opposed edge and at least one second seam-end located along the edge of the outer skin, each of the at least one first seam end and the at least one second seam end located in the fixing groove or recess;
   wherein each first seam-end formed along the first laterally opposed edge is circumferentially offset around the rim from each second seam-end formed along the second laterally opposed edge;
   wherein the rim further includes a second groove formed around substantially the entire extent of the rim, circumferentially with respect to the steering wheel, and receives a longitudinal seam interconnecting panels of the outer skin.

16. A steering wheel comprising:
a rim having an armature encapsulated by a cover of resilient material having a first groove extending around the rim generally circumferentially with respect to the steering wheel; and
an outer skin formed from a flexible material, including a plurality of panels and first and second laterally opposed edges, and provided over and around the cover, the outer skin having at least one radial seam, the at least one radial seam including at least one first seam-end located along the first laterally opposed edge and at least one second seam-end located along the edge of the outer skin;
wherein each first seam-end formed along the first laterally opposed edge is circumferentially offset around the rim from each second seam-end formed along the second laterally opposed edge.

17. The steering wheel of claim 16, wherein the at least one radial seam includes a first diagonal seam diagonally extending across the outer skin from the first longitudinal edge to the second longitudinal edge.

18. The steering wheel of claim 16, wherein the outer skin includes a lateral seam and wherein the at least one radial seam includes first and second radial seams, the first radial seam extending from the first lateral edge to the later seam and the second radial seam extending from the second lateral edge to the lateral seam.

19. The steering wheel of claim 18, wherein the rim includes a second groove extending around the rim generally circumferentially with respect to the steering wheel, the lateral seam disposed in the second groove.

20. The steering wheel of claim 16, wherein the plurality of panels includes at least four panels.

* * * * *